F. D. SPEAR.
SIGNAL LAMP.
APPLICATION FILED SEPT. 18, 1912.
1,145,624.
Patented July 6, 1915.
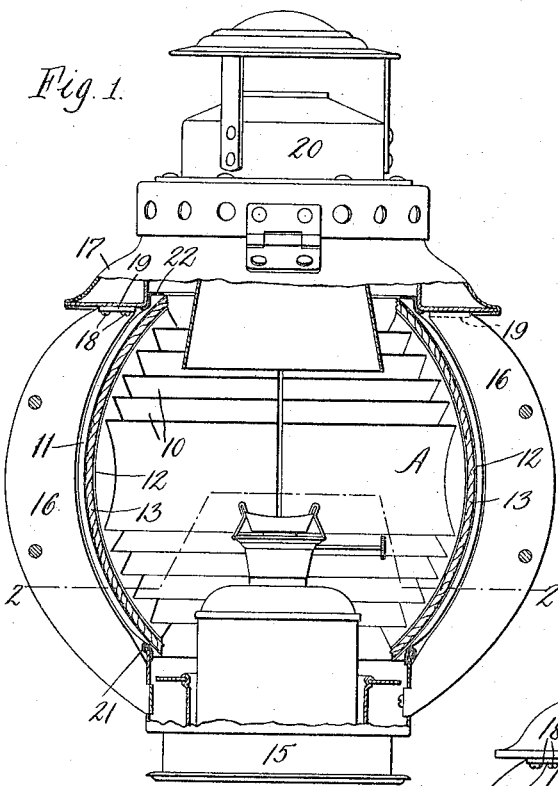
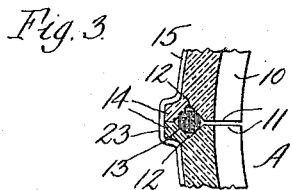
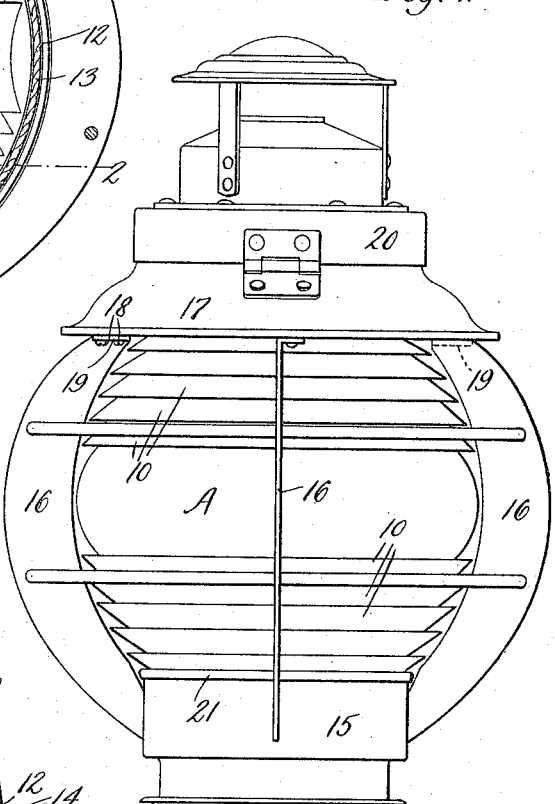
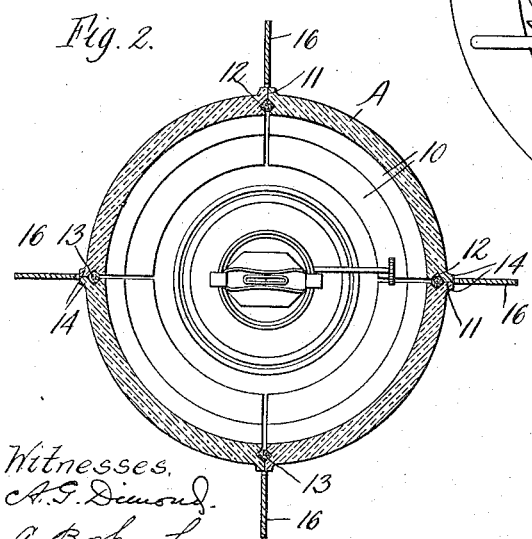

UNITED STATES PATENT OFFICE.

FURMAN D. SPEAR, OF NEW YORK, N. Y., ASSIGNOR TO ARMSPEAR MANUFACTURING COMPANY, OF NEW YORK, N. Y.

SIGNAL-LAMP.

1,145,624.

Specification of Letters Patent.

Patented July 6, 1915.

Application filed September 18, 1912. Serial No. 721,077.

*To all whom it may concern:*

Be it known that I, FURMAN D. SPEAR, a citizen of the United States, residing at New York, in the county of New York and State of New York, have invented a new and useful Improvement in Signal-Lamps, of which the following is a specification.

This invention relates to that kind of signal lamps which are used in railroad service, for instance on locomotives for indicating the character or class of the train, usually called classification lamps, or on the rear end of the last car of a train, to mark the rear end of the train, usually called marker lamps, or on switches, semaphores and other railroad appliances. Signal lamps of this kind are provided with lenses of various kinds for projecting the light.

In classification and marker lamps it is of great importance that the signal should be clearly visible for a reasonable length of time before and after the lamp has passed a signal tower or other point of observation so that the towerman, train dispatcher or other observer can observe the signal not only when the lamp is directly opposite the point of observation but also before and after reaching the point, thereby giving the observer ample time to observe the signal even when the train passes at high speed. In order to reach this result it is necessary that the lens should have a field of considerable width and also a reasonably long range, the "field" being the horizontal area or arc through which the lamp is visible and the "range" the distance to which the light is carried or projected from the lamp and still clearly visible. It is also necessary that the lamp should be of such construction that the lenses can be readily changed for adapting the lamp to give the desired signals as such lamps are usually required to carry lenses of two or more different colors. It is also necessary that the lamp as a whole should not exceed in size the customary dimensions of such lamps for which room is provided on locomotives, cars, etc., and that its weight should be such that it can be conveniently handled in use.

The object of this invention is to produce a signal lamp which will fully meet these requirements.

In the accompanying drawings: Figure 1 is a sectional elevation of this improved signal lamp. Fig. 2 is a horizontal section on line 2—2, Fig. 1. Fig. 3 is a fragmentary horizontal section illustrating the joint between two lens sections, on an enlarged scale. Fig. 4 is an elevation showing a modified construction of the lens.

A represents the lens which is spheroidal in form, having flat upper and lower ends and an approximately spherical body increasing in diameter from both ends toward the middle or equatorial zone and provided above and below said zone with refracting rings or surfaces 10 which extend circumferentially around the lens and are preferably arranged on the inner side thereof so that the outer surface of the lens is smooth, as represented in Figs. 1 and 2, although these rings may be arranged on the outer side, as represented in Fig. 4.

This lens is composed of a suitable number of upright sections arranged circumferentially side by side, four sections being shown in the drawings, of which two sections may be of one color and two of another color, for instance, two white and two red. Any other desired arrangement or combination of colors may be used, as the particular service may require. The adjoining flat sides 11 of the sections are each provided with a groove 12 which extends from end to end of the section, and these grooves, in two adjoining sections, form a duct which is open at the upper and lower ends of the lens when the sections are set up. This duct is filled with a packing strip 13 which is threaded into the duct after the lens is set up and which packs the joint between two sections and prevents the entrance of wind, rain, snow, cinders, etc. The joint is preferably so constructed that the sections are in contact on the outer side of the duct but not on the inner side, so that a narrow slit is left open on the inner side which permits a needle or blade to be passed along the duct in threading the packing strip into the same.

When the lens is so thin in the radial direction that there is not sufficient space to form a groove of proper size in the flat side of the section, the thickness of the lens may be enlarged at the joint by forming external ribs 14 on the sections.

The frame of the lamp may be constructed in any suitable manner but comprises, preferably, a base 15, upright bars 16 which are curved to follow the curvature of the lens and are secured at their lower ends to the base, a breast 17 which is detachably secured to the upper ends of the bars by any suitable means, for instance by screws 18 entering flanges 19 on the upper ends of the bars, and a top 20 hinged to the breast. The base is provided with a circular seat for the lens to which a rubber gasket 21 is applied on which the lens sections rest. The upper ends of the sections are tied together by a rubber gasket 22. When the lens sections are provided with the external ribs 14 the seat in the base is provided with notches 23 opposite the frame bars in which the ribs engage and whereby circumferential displacement of the lens is prevented, the ribs forming projections by which the lens is held in position with its joints in line with the frame bars. The breast bears upon the gasket 22 at the upper end of the lens and presses the sections inwardly and downwardly. The top of the lamp is provided with ventilating devices of any suitable or well known construction.

The spheroidal lens has a very wide field since it is transparent through a complete circle, and it also has a reasonably long range and therefore renders the signal visible for a considerable period of time. The lens is moderate in size and the lamp as a whole is no larger or heavier than the signal lamps now in use in which a number of separate disk-shaped lenses are secured in the lamp casing. The field of such individual lenses is very limited and a large portion of the lamp is composed of the opaque material of the lamp case located between the individual lenses. A lamp provided with this spheroidal sectional lens is especially desirable for railroad service where space and weight are limited. It affords a large space for combustion, particularly at the level of the burner, while the trimmings of the lamp are comparatively small and light, and it emits light horizontally even if the lamp is not hung exactly in an upright position. Such a lamp differs in these respects from a lamp having a cylindrical lens, which style of lamp is much larger and heavier for the same combustion space and which emits the light obliquely if not hung vertically. It is obvious that the packing devices which close the joints between the sections are also applicable to sectional lenses which are not of spheriodal form, and to sectional glass globes and chimneys for lamps and lanterns.

I claim as my invention:

1. A signal lamp comprising a spheroidal sectional lens arranged with its axis vertically, having flat upper and lower ends, and having above and below the equatorial zone circumferential refracting rings which increase in radius from each end of the lens toward the equatorial zone, the lens being composed of upright sections arranged circumferentially side by side.

2. A signal lamp comprising a spheroidal sectional lens arranged with its axis vertically, having flat upper and lower ends, and having above and below the equatorial zone circumferential refracting rings which increase in radius from each end of the lens toward the equatorial zone, the lens being composed of upright interchangeable sections, each section being of like form above and below the equatorial zone.

3. A signal lamp comprising a multicolor spheroidal sectional lens arranged with its axis vertically, having flat upper and lower ends, and having above and below the equatorial zone circumferential refracting rings which increase in radius from each end of the lens toward the equatorial zone, said sections being interchangeable and of different color and arranged circumferentially side by side.

4. In a signal lamp, the combination of a lens composed of sections arranged circumferentially side by side and provided in their adjacent side faces with longitudinal grooves, packings arranged in said grooves, and a lamp frame confining the upper and lower ends of said lens, substantially as set forth.

5. In a signal lamp, the combination of a lens composed of sections arranged circumferentially side by side and provided in their adjacent side faces with longitudinal packing grooves, said side faces being in contact on the outer sides of said grooves and separated from each other on the inner sides thereof, packings arranged in said grooves, and a lamp frame confining the upper and lower ends of said lens, substantially as set forth.

6. In a signal lamp, the combination with a spheroidal lens composed of upright sections arranged circumferentially side by side and packings arranged at the joints between the side faces of said sections, of a lamp frame having a base upon which said lens is seated, upright bars secured at their lower ends to said base, and a releasable holding device connected with the upper ends of said bars and bearing downwardly and inwardly against said sections near their upper ends, substantially as set forth.

7. In a signal lamp, the combination with a lamp frame having upright frame bars spaced circumferentially around the lamp, of a lens composed of sections arranged circumferentially side by side, and means for registering the joints between the sections with said frame bars, substantially as set forth.

8. In a signal lamp, the combination with a lamp frame having upright frame bars spaced circumferentially around the lamp and a base having notches opposite said frame bars, of a lens composed of sections arranged circumferentially side by side and having external ribs which enter said notches and prevent circumferential displacement of the lens, substantially as set forth.

9. A glass for lamps, composed of sections arranged circumferentially side by side and provided in their adjacent side faces with opposing longitudinal grooves, substantially as set forth.

10. A glass for lamps, composed of sections arranged circumferentially side by side and provided in their adjacent side faces with longitudinal grooves and with packings arranged in said grooves, substantially as set forth.

11. A glass for lamps, composed of like sections arranged circumferentially side by side and provided along their joints with external ribs and with opposing longitudinal grooves in their adjacent side faces, substantially as set forth.

Witness my hand in the presence of two subscribing witnesses.

FURMAN D. SPEAR.

Witnesses:
JUDSON S. PIXLEY,
J. STANTON.

Copies of this patent may be obtained for five cents each, by addressing the "Commissioner of Patents, Washington, D. C."